(12) United States Patent  
Crudgington

(10) Patent No.: US 8,191,898 B2
(45) Date of Patent: *Jun. 5, 2012

(54) BRUSH SEAL ASSEMBLY

(75) Inventor: Peter Francis Crudgington, Freshford (GB)

(73) Assignee: Cross Manufacturing Company (1938) Limited, Bath, Avon (GB)

( * ) Notice: Subject to any disclaimer, the term of this patent is extended or adjusted under 35 U.S.C. 154(b) by 0 days.

This patent is subject to a terminal disclaimer.

(21) Appl. No.: 13/020,835

(22) Filed: Feb. 4, 2011

(65) Prior Publication Data

US 2011/0121517 A1 May 26, 2011

Related U.S. Application Data

(63) Continuation of application No. 12/091,199, filed as application No. PCT/GB2007/003694 on Oct. 1, 2007.

(60) Provisional application No. 60/849,324, filed on Oct. 4, 2006.

(30) Foreign Application Priority Data

Oct. 3, 2006 (GB) .................................. 0619488.0

(51) Int. Cl.
*F16J 15/44* (2006.01)
*B21D 53/84* (2006.01)

(52) U.S. Cl. ....................................... 277/355; 29/888.3

(58) Field of Classification Search ................ 277/355
See application file for complete search history.

(56) References Cited

U.S. PATENT DOCUMENTS

| 5,066,024 A * | 11/1991 | Reisinger et al. | 277/355 |
| 2002/0130469 A1 * | 9/2002 | Kono | 277/355 |
| 2003/0178778 A1 * | 9/2003 | Szymbor et al. | 277/355 |
| 2003/0201608 A1 * | 10/2003 | Addis | 277/355 |

FOREIGN PATENT DOCUMENTS

| WO | WO 9906673 | * 2/1999 |
| WO | WO 03091609 | * 11/2003 |

\* cited by examiner

*Primary Examiner* — Vishal Patel
(74) *Attorney, Agent, or Firm* — King & Schickli, PLLC

(57) ABSTRACT

A brush seal assembly including a pair of annular plates defining an annular slot between them and a radially outer chamber opening into the slot; and an annular brush seal having bristles and an enlarged portion at its outer periphery formed by welding the bristles together, the brush seal extending through the slot with its enlarged portion retained in the chamber wherein at least a portion of one of the plates has an extension thereof which is deformed over the other plate to hold the plates together to form the assembly characterized in that one of the plates has a flat face in the region of the slot.

11 Claims, 3 Drawing Sheets

BRUSH SEAL ASSEMBLY

This application is a continuation of U.S. patent application Ser. No. 12/091,199, filed on Apr. 23, 2008, which claims priority from U.S. Provisional Application Ser. No. 60/849,324, filed on Oct. 4, 2006, and is the national stage of PCT/GB07/003,694, filed Oct. 1, 2007, which claims priority from British Application No. 0619488.0, filed Oct. 3, 2006, the full disclosures of which are incorporated herein by reference.

This invention relates to brush seal assemblies. Brush seals are typically used in, for example, gas turbine engines to seal between a stator and a rotating shaft. The bristles of the brush seal frequently extend between a pair of plates so that their free ends project there from and commonly the bristles and plates are welded into a single assembly. This arrangement enables easy handling and assembly and enables the unit to be provided with a very precise outer diameter. However, in use the bristles become worn and from time to time the seals need replacing. As the plates are made from rather expensive alloys, this can lead to a fairly high cost of ownership for the gas turbine.

In EP-A-0911554A the possibility of clamping the brush seal elements between two plates is shown, but the plates are then held together by their mounting means and this creates problems of assembly and replacement.

According to the present invention there is provided a brush seal assembly including a pair of annular plates defining an annular slot between them and a radially outer chamber opening into the slot; and an annular brush seal having an enlarged portion at its outer periphery, the brush seal extending through the slot with its enlarged portion retained in the chamber wherein at least a portion of one of the plates is deformed over the other plate to hold the plates together to form the assembly characterised in that one of the plates has a flat face in the region of the slot and/or in that the other plate has a portion for squeezing locally the bristles against the flat region to hold the bristles or in that wherein the enlarged portion is asymmetric relative to the bristles.

In one embodiment the one plate is formed by a first leg of an L section member and the extension is formed by the other.

In any embodiment the portion of the one plate may be formed by local deformation and preferably at least two portions are deformed.

Thus typically a number of tabs will be deformed out of an originally annular portion of the extension to locate and hold the two plates together. When the brush seal needs replacing, the tabs can be machined away and a new brush seal inserted. Further tabs can then be formed from previously un-deformed portions of the extension. In this way the other plate can be reused over a significant number of repair cycles and the one plate can also be reused until there is insufficient under formed material left to form the deformed portions or tabs.

Thus from another aspect the invention consists in a method of refurbishing a seal as defined above including:
(a) releasing the plates by removing or releasing the portional portions;
(b) inserting a new brush seal; and
(c) deforming at least one different portion of the one plate over the other plate to hold the plates together.

As has already been indicated, it is believed that in most instances the step of removal will need to take place by machining.

It will also be understood that one plate could be deformed around the entire circumference of the extension, if that degree of location was required. In that case the one plate would become sacrificial, but the other plate would still be reusable.

Although the invention has been defined above it is to be understood it includes any inventive combination of the features set out above or in the following description.

The invention may be performed in a number of ways and a specific embodiment will now be described, by way of example, with reference to the accompanying drawings, in which.

Figure 1:
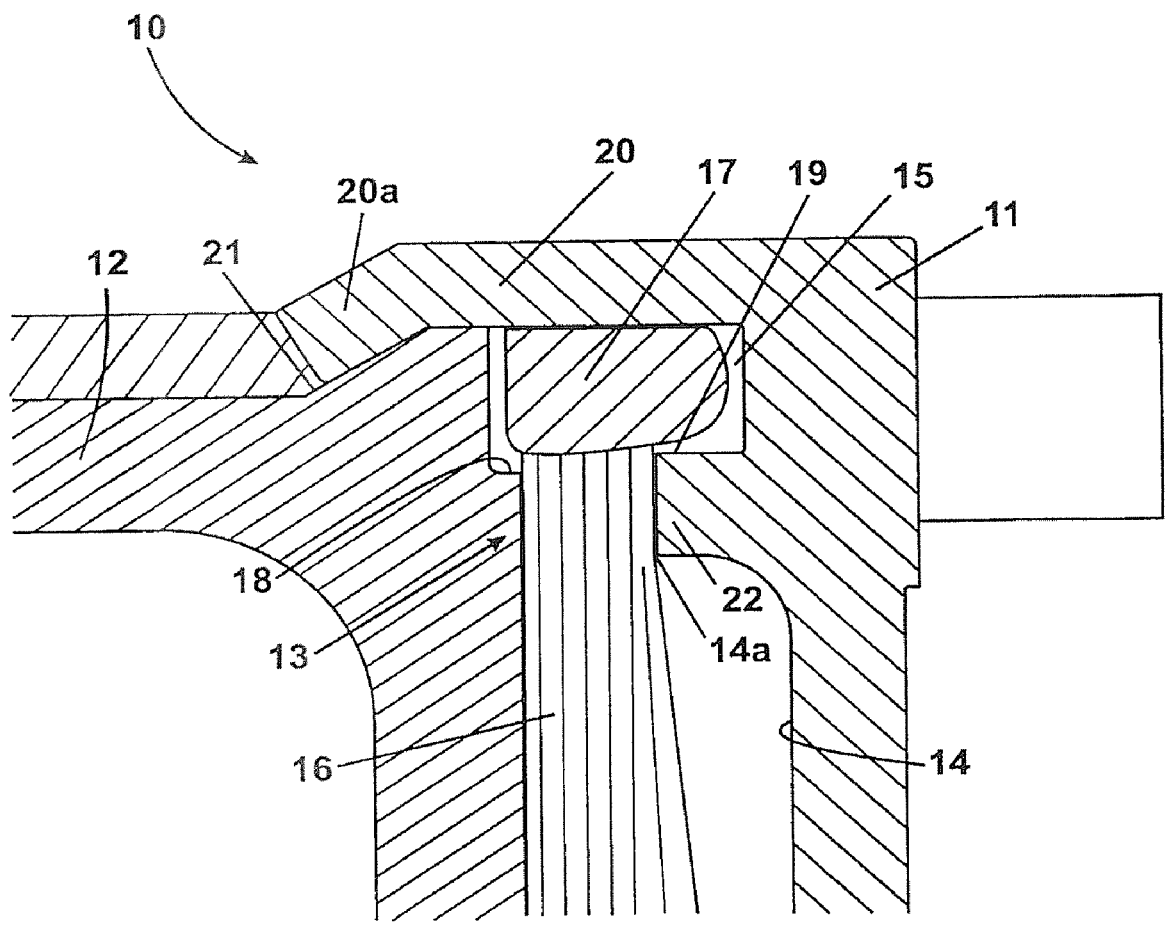
FIG. 1 is a scrap radial cross-section through a portion of an annular brush seal assembly.

Thus a brush seal assembly, generally indicated at 10, includes a front plate 11, a rear plate 12 and a brush seal 13.

The plates define a radially extending slot 14, which is open at its radially inner end (not shown) and an outer peripheral annular chamber 15, which opens into the slot 14. This will reduce machining cost and is particularly made suitable with the clamping feature mentioned below. The bristles 16 of the brush seal 13 are joined together by an enlarged asymmetric root portion 17, formed by welding the ends of the bristles together. The root portion 17 is generally rectangular in section and dimensioned so as not to pass through opening 14a, which forms the peripherally outer portion of the slot 14. It will be noted that seats 18 and 19 are formed in the chamber 15 on either side of the opening 14a so as to prevent the root portion 17 from becoming rotated to the extent that it can be pulled out through the opening 14a.

Each of the plates 11 and 12 are generally L shaped in radial section so that the plate 11 has an annular extension or leg 20 that can be locally deformed inwardly to form tabs 20a that engage on an inclined shoulder 21 formed on the plate 12. This fixing causes a projection 22 on plate 11 to clamp the bristles 16 against the plate 12 by squeezing them against the plate 12. The tabs 20a may conveniently be spaced at approximately 120° intervals.

In due course, when the bristles 16 have become worn, the assembly 10 can be removed from the gas turbine and the tabs 20a machined off to release the assembly. A new brush seal 13 can be inserted and the plates re-engaged by forming new tabs 20a in under formed portions of the leg 20. Eventually a new front plate 11 will need to be provided, but the rear plate can still be recycled. As the alloys from which the plates 11 and 12 are formed are expensive and the seals may typically be a meter or more in diameter, this recycling will significantly reduce the cost of ownership of the brush seal assembly.

Figure 2:
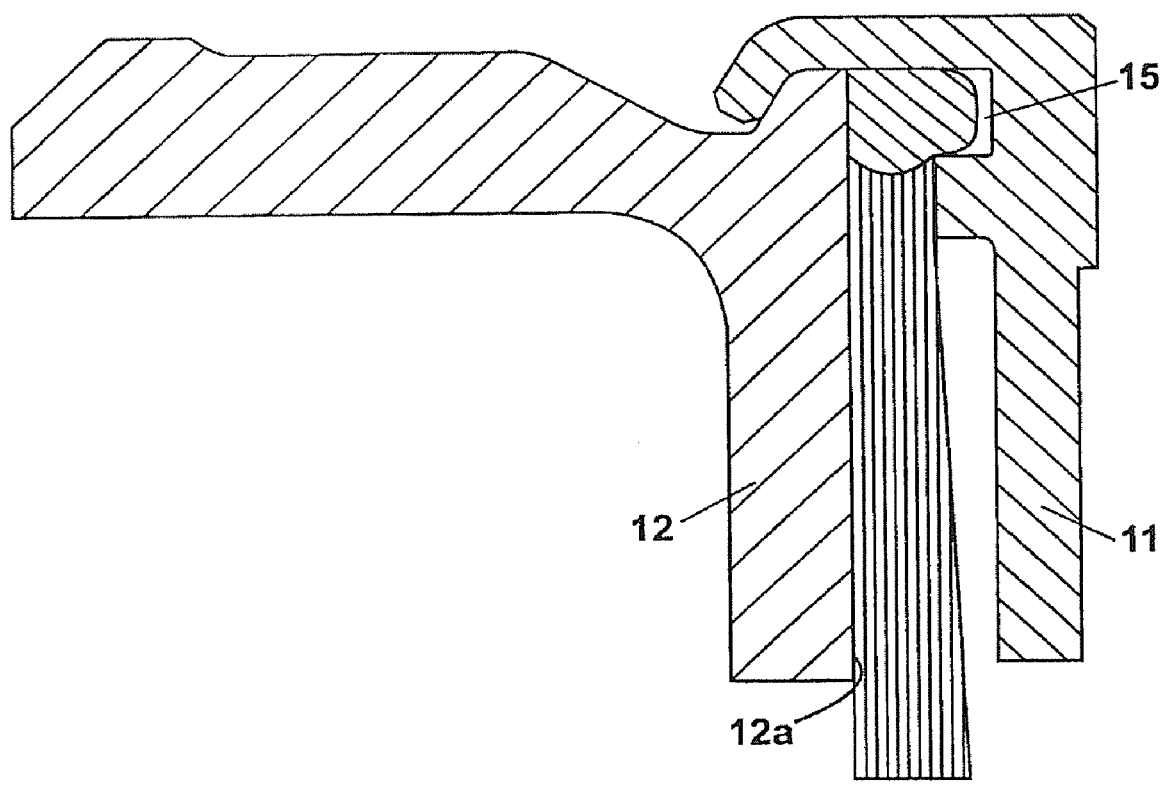
FIG. 2 is a corresponding view of another embodiment.
Figure 3:
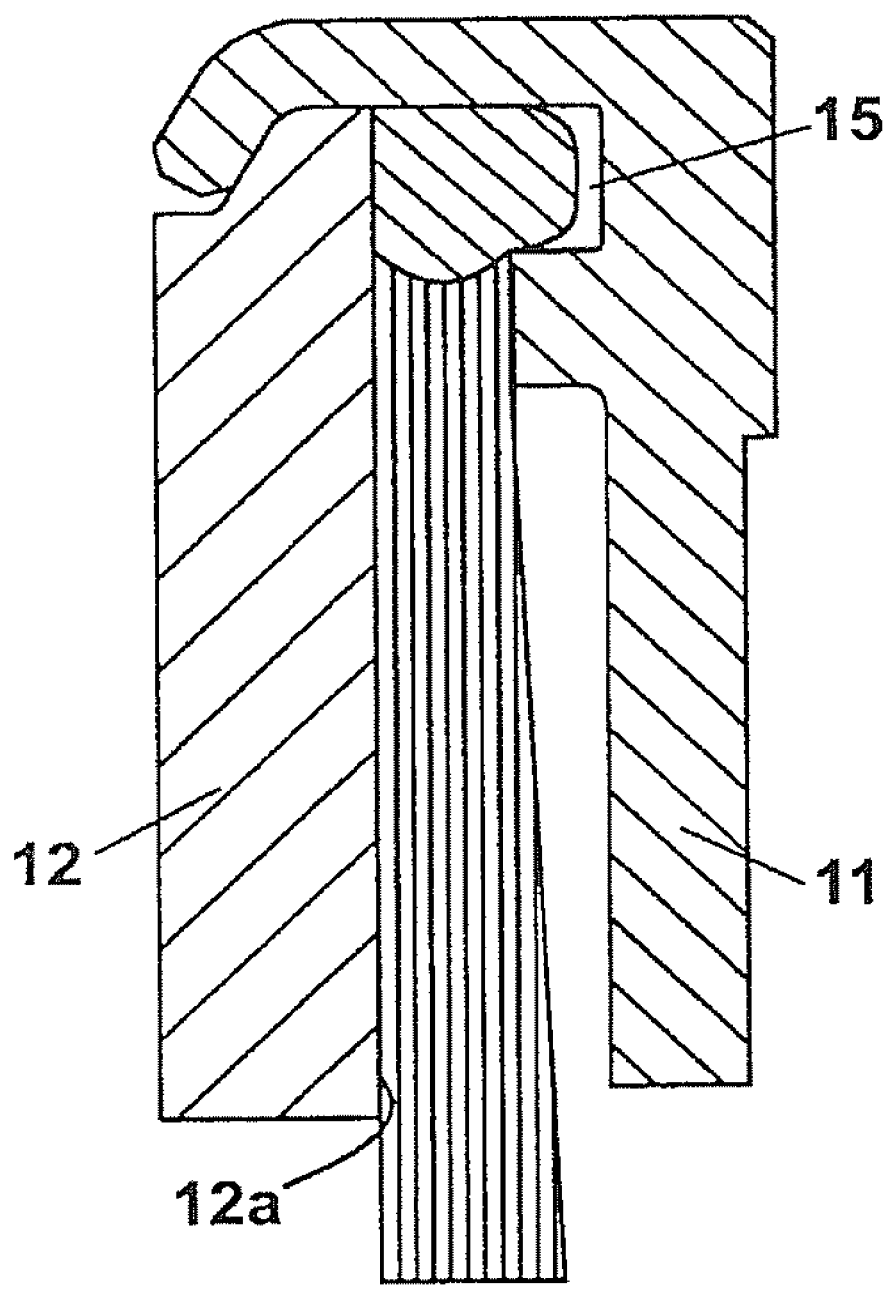
FIG. 3 is a corresponding view of a third embodiment.

FIGS. 2 and 3 illustrate alternative embodiments where a face 12a of the rear plate 12 is flat both in the bristle clamping region and in the region of the slot 14. In these cases the chamber 15 defined by the slot 14 lies entirely within the front plate 11 with the rear plate 12 simply defining one wall. This approach is surprising as it might be thought difficult to retain the brush seal 13. However, the clamping of the bristles makes it particularly efficacious.

It will be appreciated that instead of just having local tabs 20a, the plates 11,12 could be joined together around the entire circumference by spinning over the extension 20.

The invention claimed is:
1. A brush seal assembly including:
first and second annular plates defining an annular slot with generally parallel sides between said plates and a radially outer chamber opening into the slot, said chamber defined by a recess on the first plate and an opposing flat face on the second plate; and
an annular brush seal
having welded bristles forming an enlarged portion at one end, the brush seal extending through the slot with the enlarged portion retained in the chamber wherein at least a portion of the first plate has an extension thereof which is deformed over the second plate to hold the plates together to form the assembly;

wherein the first plate has a projection extending in an axial direction locally squeezing the bristles against the flat region on the second plate to hold the bristles; and wherein the second plate contacts the weld and secures said weld in the recess of the first plate.

2. A brush seal assembly as claimed in claim 1 wherein the enlarged portion is asymmetric relative to the bristles.

3. An assembly as claimed in claim 1 wherein the first plate is formed by a first leg of an L sectioned member and the extension is formed by a second leg of the L sectioned member.

4. An assembly as claimed in claim 1 wherein the face forms a periphery of the second plate.

5. A brush seal assembly including:
    first and second annular plates defining an annular slot with generally parallel sides between said plates and a radially outer chamber opening into the slot, said chamber defined by a recess on the first plate and an opposing flat face on the second plate; and
    an annular brush seal having welded bristles forming an enlarged portion at one end, the brush seal extending through the slot with the enlarged portion retained in the chamber wherein at least a portion of the first plate has a plurality of extensions thereof, at least one of said extensions being deformed over the second plate to hold the plates together to form the assembly;

wherein the first plate has a projection extending in an axial direction locally squeezing the bristles against the flat region on the second plate to hold the bristles; and wherein the second plate contacts the weld and secures said weld in the recess of the first plate.

6. A brush seal assembly as claimed in claim 5 wherein the enlarged portion is asymmetric relative to the bristles.

7. An assembly as claimed in claim 5 wherein the first plate is formed by a first leg of an L sectioned member and the portion including the extensions is formed by a second leg of the L sectioned member.

8. An assembly as claimed in claim 5 wherein the face forms a periphery of the second plate.

9. A method of refurbishing a brush seal assembly as claimed in claim 5 including:
    (a) releasing the plates by removing or releasing the deformed extension;
    (b) inserting a new brush seal as in claim 5; and
    (c) deforming at least one different extension of the one plate over the other plate to hold the plates together.

10. The method as claimed in claim 9, wherein at least two extensions are deformed.

11. The method as claimed in claim 9, wherein the step of removal is performed by machining.

* * * * *